United States Patent

Sterling, IV

[11] Patent Number: 5,812,128
[45] Date of Patent: Sep. 22, 1998

[54] USER DEFINED TEMPLATE ARRANGEMENT OF OBJECTS IN A CONTAINER

[75] Inventor: Merle Douglas Sterling, IV, Mountain View, Calif.

[73] Assignee: International Business Machines Corporation, Armonk, N.Y.

[21] Appl. No.: 766,541

[22] Filed: Dec. 11, 1996

[51] Int. Cl.[6] ........................................................ G06F 3/14
[52] U.S. Cl. ........................ 345/334; 345/348; 345/339
[58] Field of Search .................................. 345/334, 333, 345/339, 348, 342, 356, 340, 346

[56] References Cited

U.S. PATENT DOCUMENTS

| | | | |
|---|---|---|---|
| 5,255,363 | 10/1993 | Seyler | 395/159 X |
| 5,371,847 | 12/1994 | Hargrove | 345/342 |
| 5,557,728 | 9/1996 | Garrett et al. | 345/340 |
| 5,642,490 | 6/1997 | Morgan et al. | 345/348 X |
| 5,652,850 | 7/1997 | Hollander | 345/333 |

*Primary Examiner*—Raymond J. Bayerl
*Attorney, Agent, or Firm*—Mark S. Walker

[57] ABSTRACT

A system user defines a template for the arrangement of icons (or objects) in a container. The template is a selection of grid cells into which icons may be placed during rearrangement. The user defined template is dropped onto a container causing the container to be rearranged so that icons occupy only the positions selected for occupation by the template. An alternate embodiment displays a grid of cells contained in a container selected for rearrangement, allowing the user to select the final pattern at the time of rearrangement.

10 Claims, 5 Drawing Sheets ns 5,812,128

USER DEFINED TEMPLATE ARRANGEMENT OF OBJECTS IN A CONTAINER

CROSS-REFERENCE TO RELATED INVENTIONS

The present invention is related to U.S. Ser. No. 08/766,542 entitled "Arrangement of Selected Subset of Objects in a Container", filed on Dec. 11, 1996 bearing attorney docket number AT996-294.

BACKGROUND OF THE INVENTION

1. Field of the Invention

The present invention relates to computer systems having display devices for displaying information to the computer system user. More particularly, the present invention relates to graphical information display devices that organize objects into containers and allow users to interact with the system by selecting objects within a container. Still more particularly, the present invention supports automatic arrangement of objects within a container according to a format specified by the system user.

2. Background and Related Art

Computer systems with graphical user interfaces (GUIs) permit the system user to select programs to execute or other actions by selecting ("clicking") on an icon representing an actionable object. The Apple Macintosh operating system introduced the use of graphical user interfaces and selectable objects. Operating systems such as the IBM OS/2 operating system, the Microsoft Windows operating system, and the OSF Common Desktop Environment for Unix operating systems provide graphical interface support using objects.

Actionable objects are represented as icons on the display screen.

The user operates a pointing device such as a mouse, track ball, track point, or touchpad to move a cursor on the display screen. One or more selection buttons are provided to select an icon or to activate the program represented by the icon. The icons are typically grouped into containers (often called "folders") with other related icons. For example, all of the icons relating to a word processing product may be grouped into a single folder. A folder is an actionable object that can be opened to display its contents which may include other folders and icons. The full display screen is itself a container containing the folders and objects presented to the user.

The system user adds icons to his or her system when new programs are added or when new files or documents are created. This may lead to a cluttered container or desktop with icons scattered without any discernable order. Most graphical user interface systems allow the user to drag icons into different positions, allowing them to rearrange the icons to suit their taste. These systems also provide an automatic arrange functions that rearrange all of the icons in a container. Automatic arrangement functions arrange the icons in an order specified by the user, for example, alphabetically by the name of the icon. The arrangement places the icons within the folder based on the systems arrangement specification. The OS/2 operating system, by default, arranges the icons in rows, left to right starting at the top left of the display. Windows 3.1 arranges the icons in rows starting at the bottom left, while Windows95 arranges the icons in columns starting at the top left of the screen.

Automatic arrangement has the disadvantage that all objects or icons in a container are rearranged according to a system specified algorithm. The system user may prefer an icon arrangement different than that or those provided by the operating system. Existing systems do not provide an ability for the user to define a pattern in which to rearrange cons in a container.

Thus, a technical problem exists of providing a way for a system user to define an icon arrangement layout for the computer system to use when automatically rearranging icons or objects in a container.

SUMMARY OF THE INVENTION

The present invention is directed to a computer implemented system for arranging objects in a displayable container according to a user defined format. The system comprises: means for specifying a pattern of grid cell locations for arranged object placement; means for requesting arrangement of objects in a displayable container; means for determining a number of cells in the displayable container; and means for rearranging icons in the container by placing objects only in the specified grid cell locations.

The present invention is directed to providing a process for specifying a user defined arrangement template for rearranging icons in a container. The user can define a template by specifying which cells in a grid representing the display screen are to be occupied by icons. The system then determines the grid size and extent in the particular container. Existing objects are then placed in the grid according to the specified pattern. An alternate embodiment allows specification of the grid positions to be occupied at the time rearrangement is selected.

It is therefore an object of the present invention to provide the system user with a method and means to specify the layout of icons or objects when automatically arranged in a container.

It is yet another object of the invention to provide a system and method for rearranging icons in a container according to a pattern specified by the system user.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
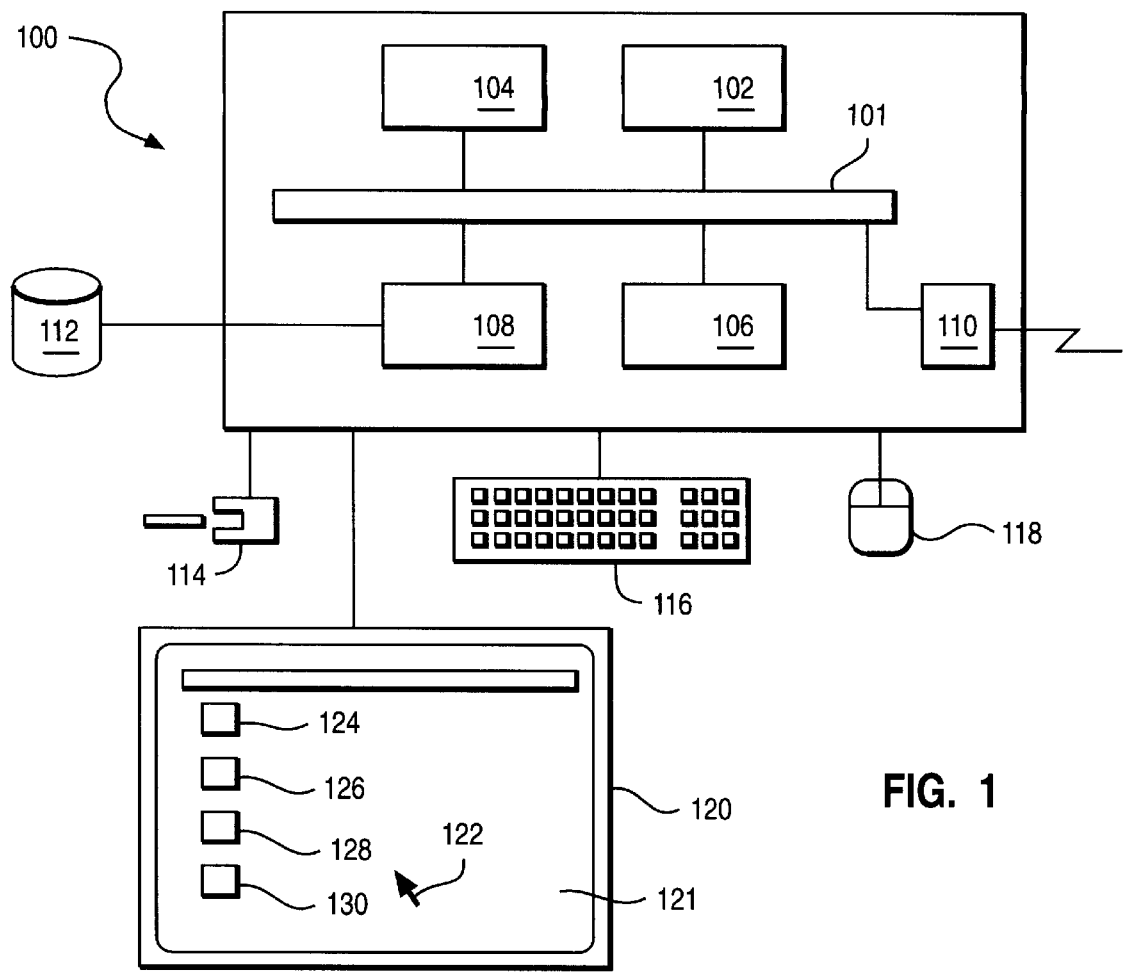
FIG. 1 is a block diagram of a computer system according to the preferred embodiment of the present invention.

The present invention is implemented in a computer system such as that shown in FIG. 1. The computer system 100 includes a processing complex 104 of one or more central processing units (CPUs) and random access memory and read-only memory 102. The central processing units can be of any type including devices such as the Intel 486, Intel Pentium, IBM PowerPC or other processor. The system also includes an input/output controller 108 for managing the interface between the computer system and external devices. Network controller 110 allows interaction with a local area or wide area network.

External devices can include fixed disk drives 112 and removable storage devices 114. The fixed and removable devices can be magnetic or optical devices. A keyboard 116 and pointing device 118 are provided for user entry of data. The pointing device 118 can be of any known type such as a mouse, trackball, trackpoint, touchpad or touch screen. The display 120 displays information generated by the system. The display includes facilities to display a cursor 122 that tracks the pointing device. The display screen displays icons or objects 124, 126, 128, 130. These objects represent actionable objects that are selectable by the user. By actionable objects it is meant that selection of the object causes a defined action to be initiated. These actions can include the execution of a program, the opening of a folder or other container, or the modification of the display environment.

The preferred embodiment of the present invention operates on an IBM Personal Computer workstation having an Intel Pentium CPU. The preferred embodiment works in conjunction with the IBM OS/2 operating system Presentation Manager function. The OS/2 Presentation Manager controls the display of information on the display screen. The Presentation Manager is used by application developers to construct and display information on the screen. The objects placed on the display screen are termed "Presentation Manager Controls" or simply "PM Controls." A subset of the controls are "PM Container Controls" that control the behavior of container objects such as the desktop or folders.

The present invention is implemented by modifying an existing "PM Container Control" or by adding a new "PM Container Control." In the alternative, the invention can be implemented in an application program outside of the operating system. Other operating systems have analogous functions, for example, Microsoft Windows includes "List Controls" which provide similar function. The invention can be implemented in the operating system function that controls the display of icons or objects in containers.

Figure 2:
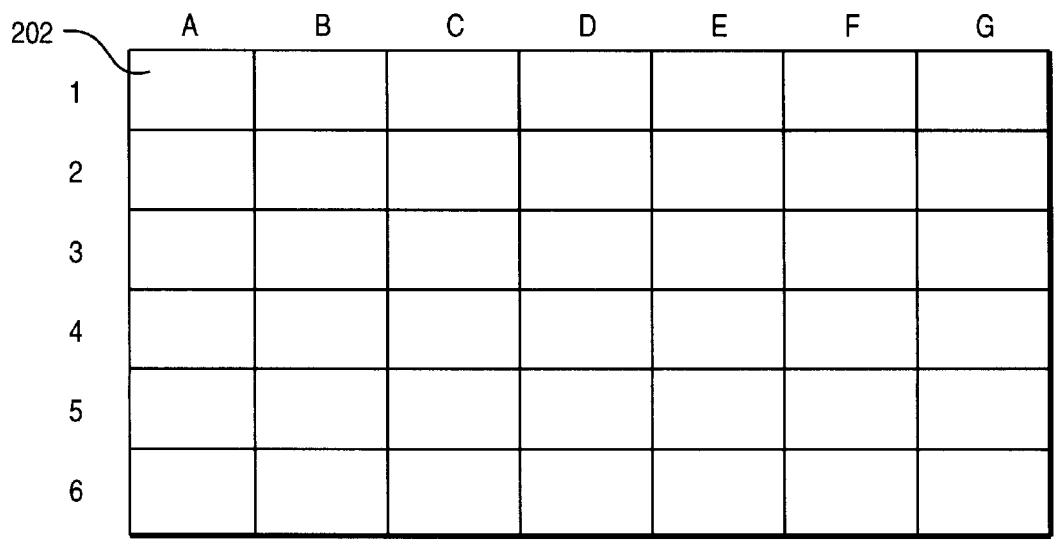
FIG. 2 is an illustration of a display screen according to the present invention divided into cells.
Figure 3:
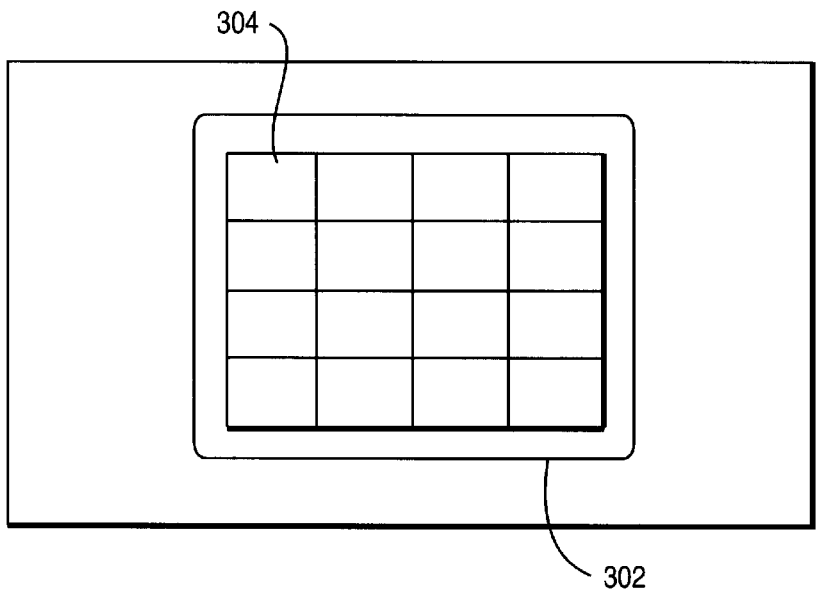
FIG. 3 is an illustration of a display screen and container divided into cells.

Display screen 121 can be divided into a grid of cells that can contain icons or objects. The entire display screen is divided as shown in FIG. 2. Each cell 202 contains one desktop icon. A container other than the desktop can be similarly divided as shown in FIG. 3. The container 302 is subdivided into cells such as 304.

The size of each cell and the number of cells in the container is dependent on the resolution of the display screen and the size of icons to be displayed. Display device resolution is expressed as a certain number of pixels (picture elements) displayed horizontally and vertically. Common dimensions are 1024 pixels horizontally and 768 vertically (meaning that there are 768 rows of 1024 pixels each.) Another common dimension is 640×480. A container displayed on the desktop will have a dimension that can be expressed in pixels.

Icons can be of varying sizes. One approach to dividing the container space is to determine the maximum rectangular dimension, and then divide the container space into equal cells of that rectangular size. Alternatively, a standard cell size can be defined. For purposes of illustration, the present invention will consider an icon cell of 20 pixels by 20 pixels. Thus, a 1024×768 display screen can be divided into 38 rows of 51 cells.

The present invention implements a user defined container arrangement template. The template defines the grid cells the user desires to have occupied by objects or icons. The permitted arrangement grid can be defined and stored before attempting an arrangement, or, in an alternate embodiment, it can be specified at the time of arrangement.

Figure 4:
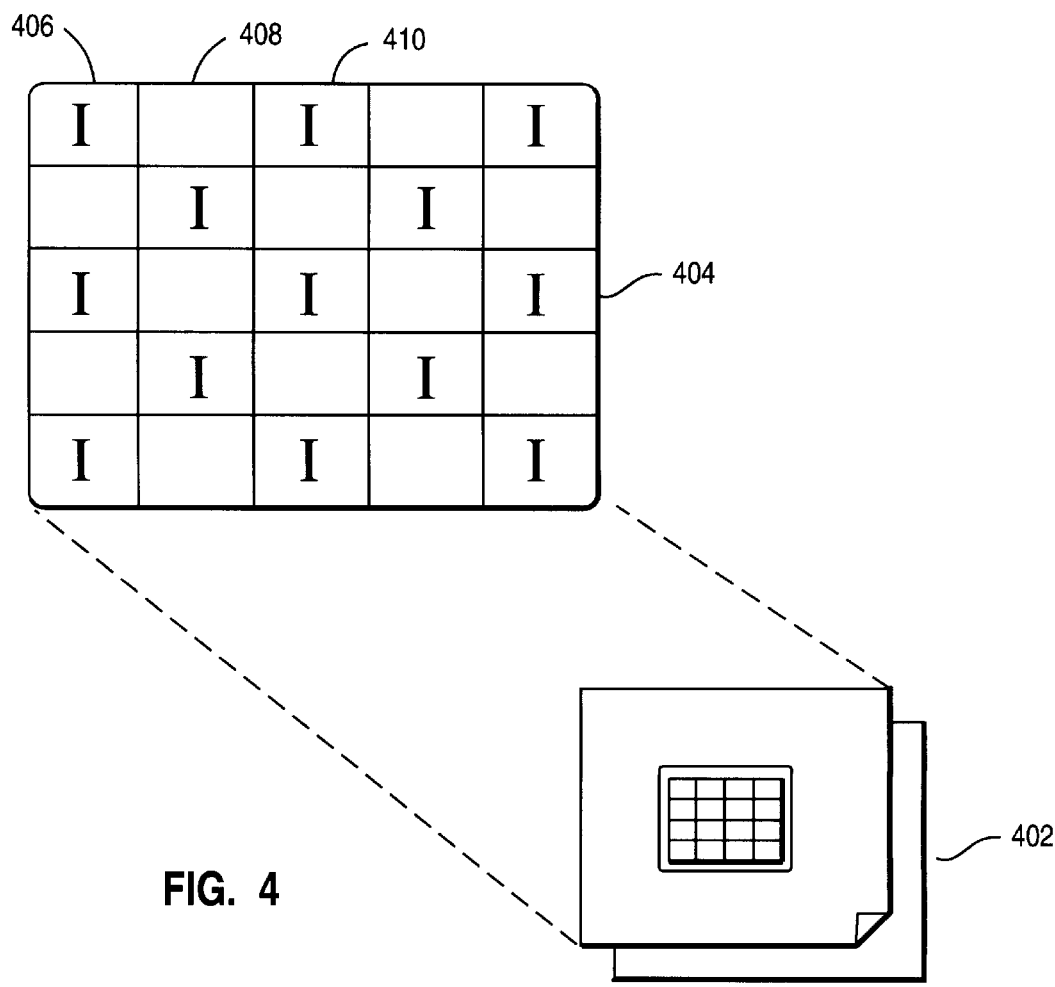
FIG. 4 is an illustration of a user defined arrangement template.

The user defines the arrangement template by marking a representative grid. FIG. 4 illustrates this step. A user defined arrangement template icon 402 is opened to display a grid 404. The grid information is maintained as part of the "settings" or "properties" of the template icon. The cells of the grid are marked to indicate those cells that will be occupied. For example, cells 406 and 410 have been marked with an "I" to indicate "icons permitted" while cell 408 has been left blank. The marking of cells can take any known form and is not limited to this particular example. The pattern defined in grid 404 is a checkerboard.

Figure 5:
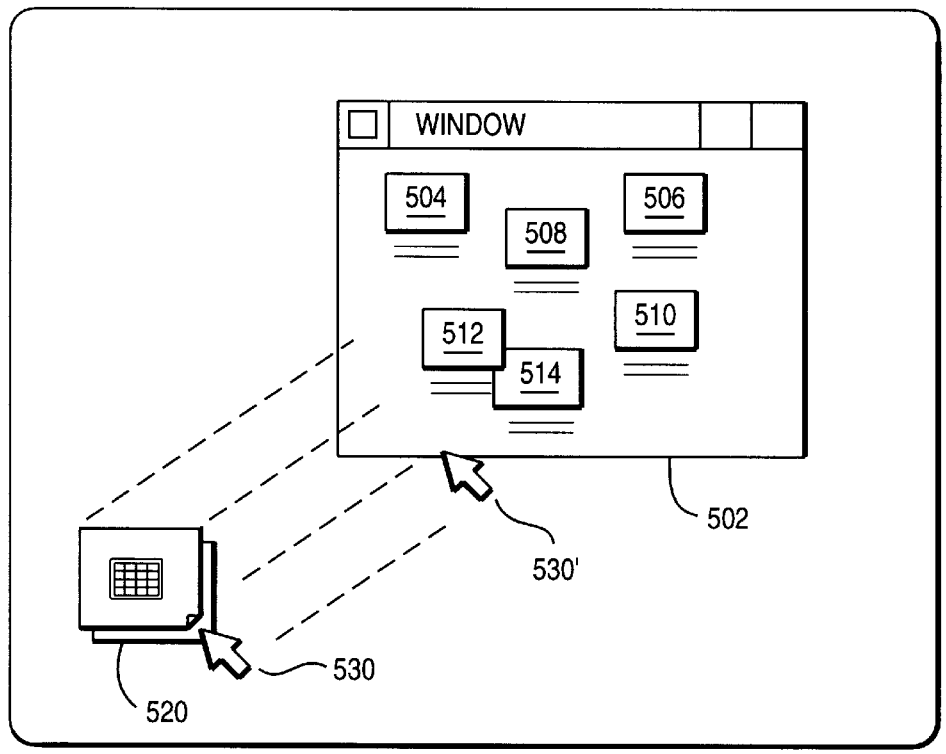
FIG. 5 is an illustration of dragging a user defined arrangement template to a container for action.

A container 502 in FIG. 5 is arranged by dragging the user defined arrangement template 520 to the container and dropping it on the container. The "drag-and-drop" function is a known function of OS/2 Presentation Manager and other graphical user interface tools. The template 520 is selected by cursor 530 and then "dragged" by, for example, holding down one of the mouse buttons while moving the mouse to the new position 530'.

Figure 6:
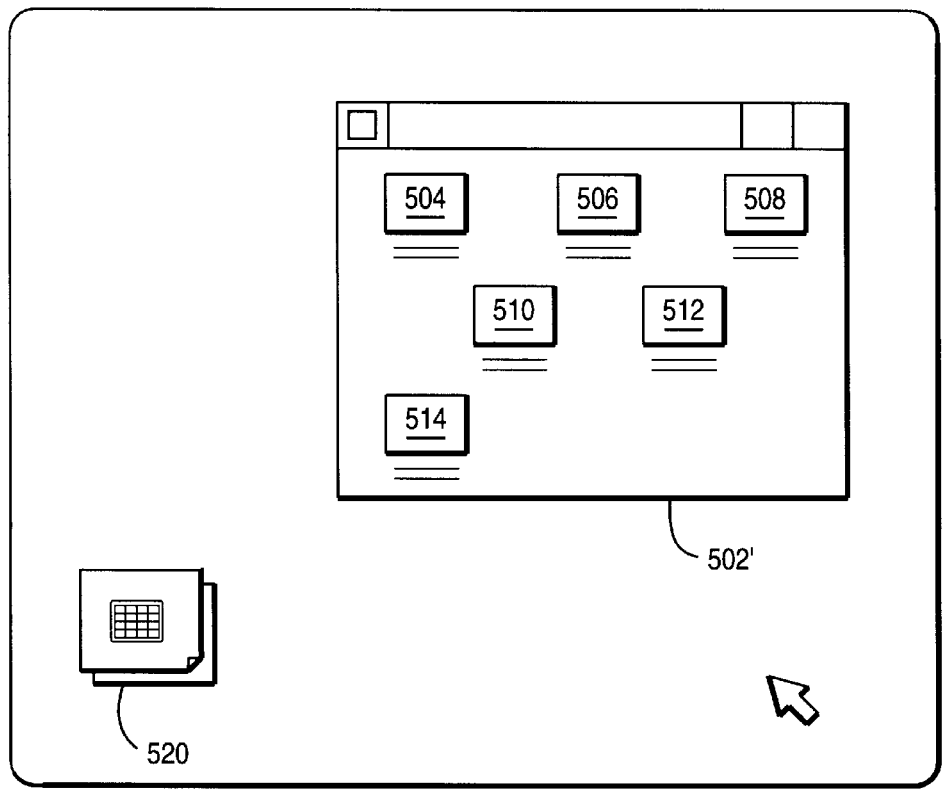
FIG. 6 is an illustration of the resulting rearranged container.

The rearranged container 502' is shown in FIG. 6. The icons have been rearranged to be in the defined checkerboard pattern.

The example illustrates rearrangement of all objects in a container. The present invention can be modified to arrange only a subset of the objects in the container by adding a subset selection step before the rearrangement step.

Figure 7:
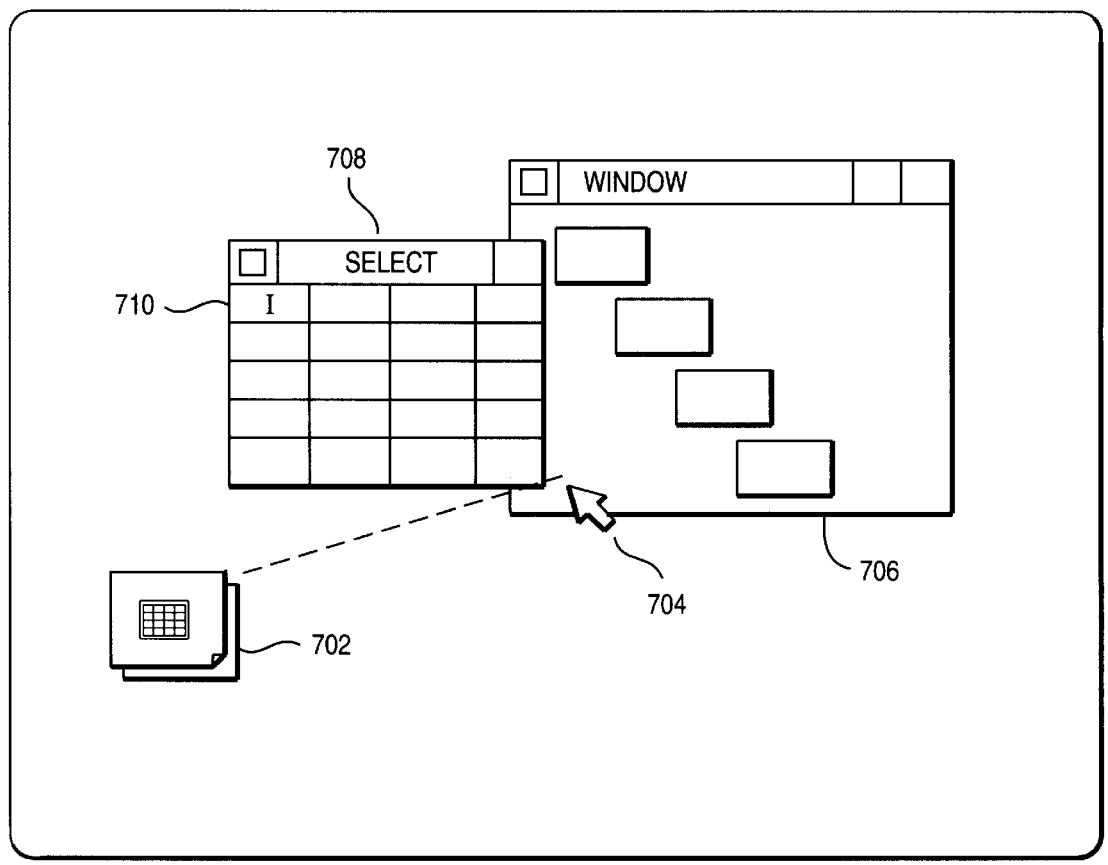
FIG. 7 is an illustration of the user defined specification of arrangement locations at the time of arrangement.

FIG. 7 illustrates an alternate embodiment of the invention where the specification of cells to be occupied occurs at the time of rearrangement. This method has the advantage of being able to display the actual number of cells available for placement, while the preferred embodiment applies a pattern to an indeterminate number of cells.

The "user defined template" 702 is dragged to the container 706. The template 702 in this embodiment does not contain specific grid layouts. The template contains the information that the container onto which it is dropped is to be rearranged according to a user defined pattern. After the template 702 is dropped on container 706, a grid pop-up 710 appears on the desktop. The grid pop-up 710 contains cells representative of the final container layout. For example, if the container can have 5 cells by 5 cells, then the grid pop-up has a 5 by 5 layout. A larger container would have a larger grid pop-up.

The user then indicates cells to be occupied by marking occupied cells 708. As before, the specific marking method can be any known method.

Figure 8:
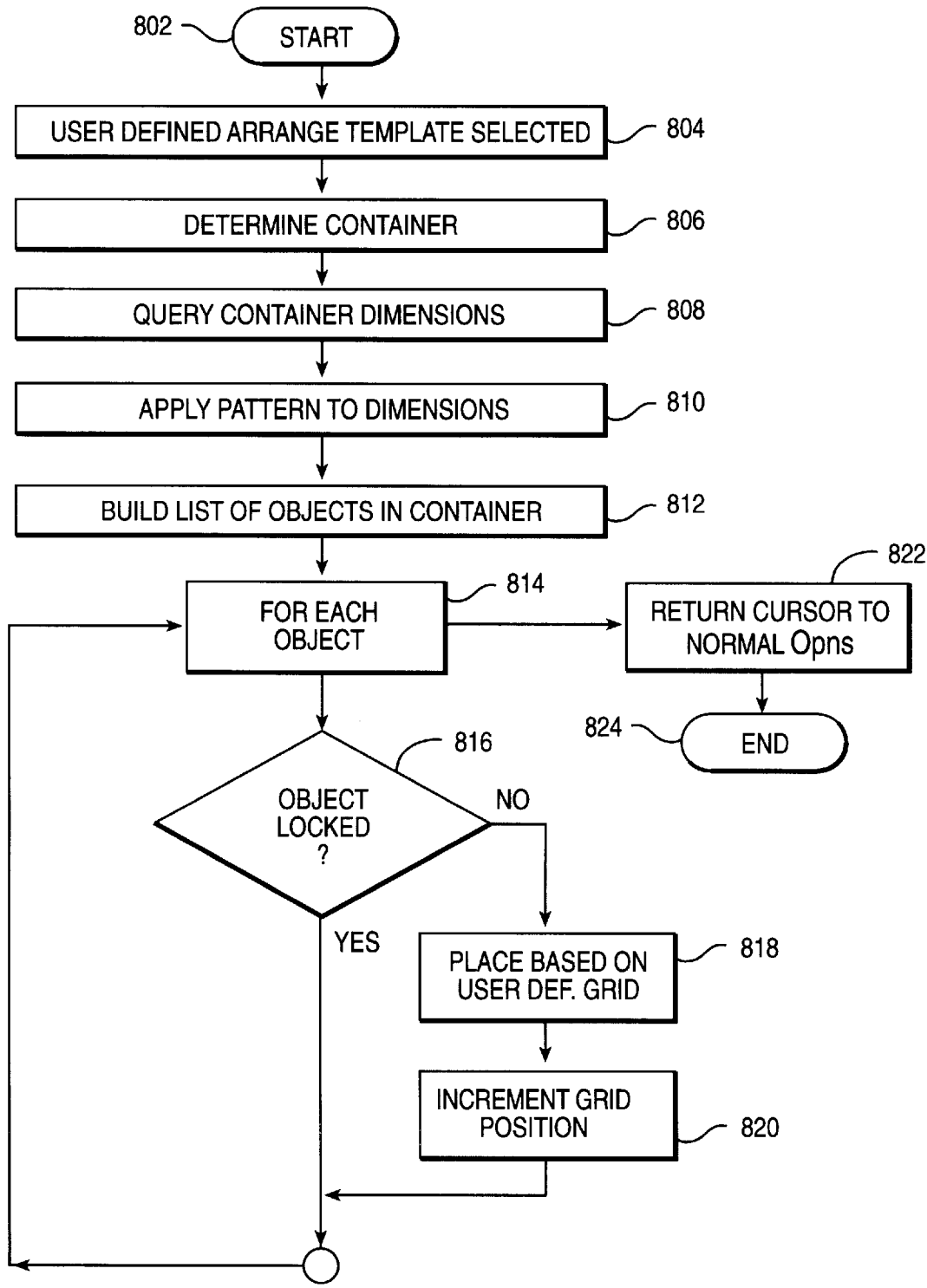
FIG. 8 is a flowchart depicting the process of the present invention.

The process of automatic arrangement according to a user defined template is shown in FIG. 8. After starting 802, the process first detects selection 804 of the user defined arrange template. The process next determines the identity of the container on which the template is dropped 806. The container identity is used to query the container dimensions 808. The container dimensions are used to calculate the number of cells displayable by that container. The pattern is then applied to the resulting cells 810. In an alternate embodiment, the user is queried to supply the pattern on a presentation of the actual number of cells displayable in the container. The system next builds a list of objects in the container 812. For each object in the list 814, the system first test to determine whether the object is locked 816 meaning it is not to be rearranged. If the object is locked, processing moves to the next object in the list. If not locked, the object is placed in the grid cell 818, and the grid position incremented 820 to the next cell selected for display of an icon. Once all objects have been processed, the cursor is returned to its normal shape 822 and the function exits 824.

The preferred embodiment does not check whether or not a cell position is occupied by a locked object. If an object is already in a cell position, the arrangement will place a rearranged icon on top of it. An alternate embodiment of the invention includes the ability to check for an avoid conflicting placements of icons.

The preferred embodiment uses "drag-and-drop" techniques to activate container rearrangement according to a user defined pattern. Other activation techniques could be employed within the scope of the invention. For example, a menu item or pop-up action could be provided to the container. The selection of the menu item or pop-up item would request specification of a template to apply from stored templates or one defined at the time of rearrangement.

It will be understood from the foregoing description that various modifications and changes may be made in the preferred embodiment of the present invention without departing from its true spirit. For example, the user defined template based arrangement can apply to desktop displays that use simple text rather than graphical icons. It is intended that this description is for purposes of illustration only and should not be construed in a limiting sense. The scope of this invention should be limited only by the language of the following claims.

I claim:

1. A computer implemented system for arranging objects in a displayable container according to a user defined pattern, the system comprising:

means for user controlled specification of a pattern of grid cell locations for arranged object placement;

means for requesting arrangement of objects in a displayable container;

means for determining a number of cells in the displayable container;

means for applying said pattern to said cells to establish specified grid cell locations;

means for rearranging objects in said container by placing objects only in the specified grid cell locations.

2. The system of claim 1, wherein the means for rearranging includes:

means for identifying all objects in said container;

means for testing each object to determine whether or not send object is a rearrangeable object;

means for placing each of said rearrangeable objects at one of said specified grid cell locations.

3. The system of claim 1, further comprising:

means for specifying for arrangement a subset of objects in said container.

4. A computer implemented method for rearranging objects in a container according to a template specified by a system user, the computer having a memory and processing means, the method comprising the steps of:

defining a template representing grid locations permitted to be occupied by objects after rearrangement;

repositioning each rearrangeable object in a container into one of the specified grid locations in accordance with said template.

5. The method of claim 4, further comprising the step of:

determining the grid dimensions of said container.

6. The method of claim 5, wherein the step of repositioning each rearrangeable object comprises of the steps of:

building a list in said memory of the objects in said container;

iterating through said list and performing the following steps on each item:

testing the object to determine whether said object is moveable;

if moveable, repositioning the object to the next occupiable cell in said grid;

if moveable, updating the next occupiable position.

7. The method of claim 6, further comprising the step of:

selecting for rearrangement a subset of objects in said container; and indicating said selected subset as rearrangeable objects.

8. A computer program product having a computer readable medium having computer program logic recorded thereon for rearranging moveable objects in a container to conform to a user specified format, said computer program product comprising:

computer program product means having computer readable means for storing a user specified object pattern;

computer program product means having computer readable means for rearranging each moveable object in said container in accordance with said user specified object pattern.

9. The computer program product of claim 8, wherein the computer program product means having computer readable means for rearranging each moveable object in said container includes:

computer program product means having computer readable means for determining a first grid cell for placement of a first object;

computer program product means having computer readable means for placing said first moveable object;

computer program product means having computer readable means for testing said user selectable object format to determine a next grid cell for placement;

computer program product means having computer readable means for placing a next moveable object;

computer program product means having computer readable means for repeating the steps of determining a next grid cell and placing a next object until all moveable objects have been placed.

10. The computer program product of claim 8, further comprising:

computer program product means having computer readable means for selecting a subset of objects in a container for rearrangement; and computer program product means having computer readable means for indicating said subset of objects are moveable objects.

* * * * *